3,081,415
HEADLIGHT DIMMING DEVICE
Robert C. Casselman, Auburndale, and Charles H. Matz, Chestnut Hill, Mass., assignors to Polaroid Corporation, Cambridge, Mass., a corporation of Delaware
Filed Oct. 30, 1959, Ser. No. 849,971
10 Claims. (Cl. 315—83)

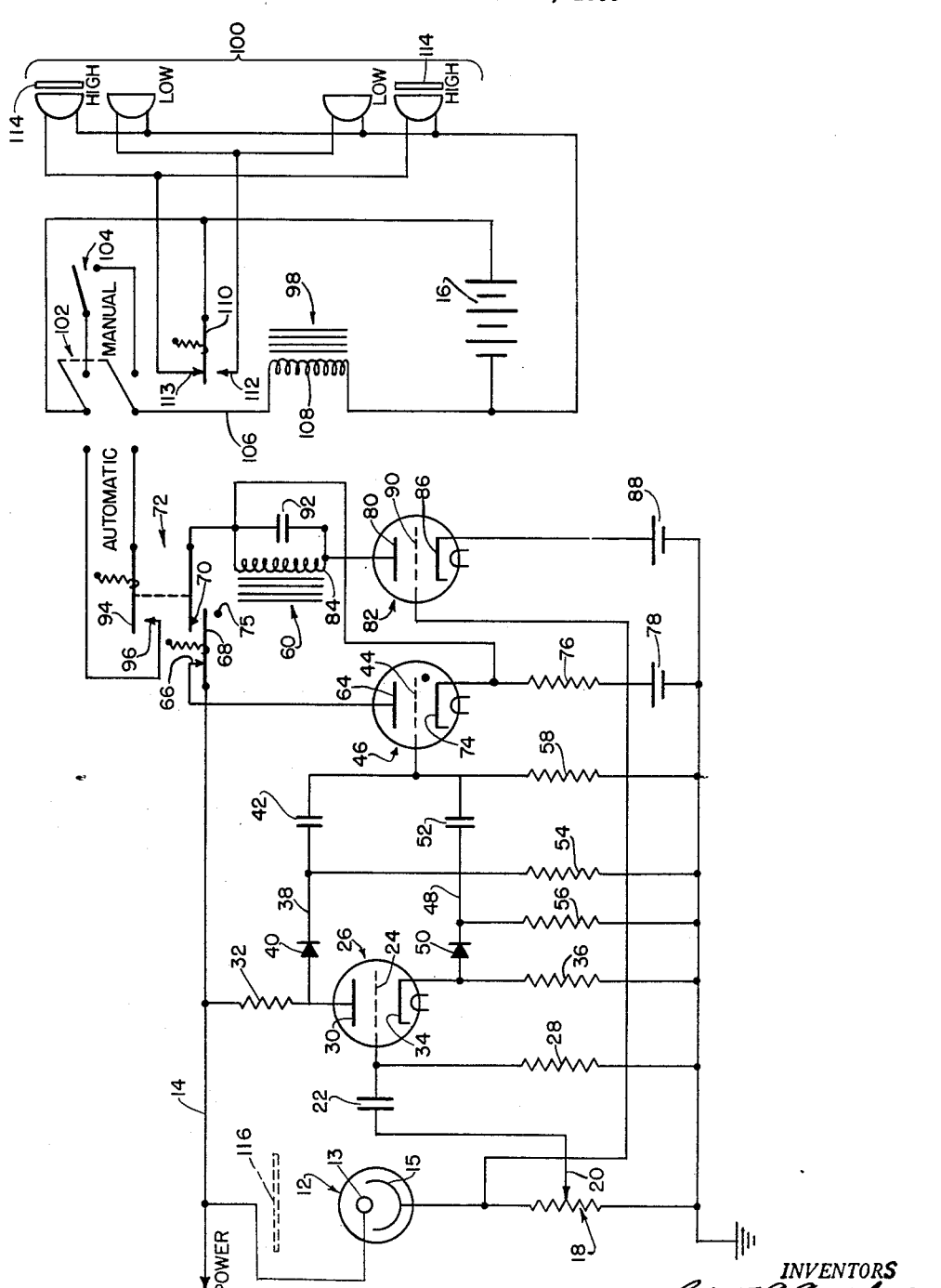

This invention relates to a light-sensitive control device which is automatically triggered by an abrupt change, such as a pulse, of incident light and more particularly to a device of the character described which is adapted to be actuated by and to control the headlights of automotive vehicles.

Various systems for automatically controlling the high and low beams of an automotive vehicle in response to the light from an approaching vehicle to prevent objectionable and dangerous glare are known and, to a certain extent, are commercially available. However, to the best of our knowledge, these devices have, in general, involved means responsive to substantially any light of proper incidence and intensity, including light gradually increasing in intensity with respect to the responsive means such as that emitted by either the high- or low-beam filaments of an approaching vehicle as it gradually comes nearer. In contrast thereto, the device of the present invention is actuated only by a proper pulse of light or by light which is at least undergoing a very rapid or abrupt change of intensity.

A particular advantage of the device of the present invention is its adaptability to use with a light-polarizing headlight system, wherein, desirably, no deflection of the high beams would occur when two light-polarizing headlight equipped cars approached one another, because the light-polarizing viewing visors thereof would filter out glare, but wherein the high beam of a light-polarizing headlight equipped car could be automatically lowered by the operator of an approaching non-equipped car merely by the operator of the latter car switching his headlights manually from high to low beam or vice-versa. This would serve a very useful purpose in safeguarding the driver of the non-equipped car against being subjected to glare from the high polarized beam of the aforesaid equipped car, it being understood, of course, that the driver of an equipped car having a light-polarizing visor would be free from the aforesaid glare.

With the foregoing considerations in mind, a principal object of the present invention is to safeguard the driver of a first automotive vehicle, unequipped with a glare-eliminating viewing visor or the like, from the high beam of a second approaching vehicle by providing a novel, light-sensitive, automatic, headlight dimming device for incorporation in the second, or offending, vehicle, the device being responsive to the aforesaid driver's switching his headlights from high to low beam, or vice-versa.

Other objects of the present invention are to provide a device of the character described for use with a light-polarizing headlight system in which light-polarizing means, such as polarizing filters, are employed in association with the headlights and in the form of a viewing visor or the like in front of the driver's eyes; to provide a headlight dimming device for incorporation in a first vehicle which is initially actuated by a pulse of incident light produced by a change from high to low beam, or vice-versa, from the headlights of a second approaching vehicle, and which maintains its actuated condition in response to continued substantially steady or slowly varying incident light from the headlights of the second approaching vehicle; to provide a device which causes the headlights of a vehicle equipped therewith and which have been automatically switched to a low-beam condition by the headlights of an approaching vehicle to reassume their high-beam condition when the approaching vehicle or vehicles have passed; and to provide override means in conjunction with the device whereby manual control of the high and low beams is optionally possible at any time.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawing.

Referring now to the figure which is a circuit diagram of the device, there is shown a photocell 12 which, as will be understood, is mounted in the equipped vehicle at a location suitable for intercepting the headlight beams of an approaching vehicle. The power line 14 is connected to any suitable source of power, including, as may be necessary by reason of the types of electronic tubes or other circuitry employed, a power pack, vibrator, step-up transformer, or the like (not shown) and which may, for example, originate with the 6 or 12 volt battery 16 of the vehicle.

The photocell 12 is of a photovoltaic type but could, in a modification, be a photomultiplier or other photosensitive means. The anode 13 of photocell 12 is connected to line 14; the cathode 15 is connected through the tapped resistor or potentiometer 18 to ground. The current flowing in the circuit composed of the power supply, photoelectric cell 12 and potentiometer 18 and, accordingly, the voltage drop across potentiometer 18 is proportional to the amount of light falling upon the photocell. Any change in that amount changes this voltage drop. The adjustable tap 20, connected to coupling condenser 22 and thence to the grid 24 of electronic tube 26, permits any desired part of the voltage change to be applied to the grid coupling capacitor 22 of the electronic tube.

An increase in the light incident on photoelectric cell 12 produces a positive pulse and a decrease thereof produces a negative pulse on grid capacitor 22. Condenser 22 and grid resistor 28, connected between grid 24 and ground, constitute a differentiating circuit having a time constant which is so chosen as to respond functionally only to a certain or predetermined rate of change in the voltage drop across resistor 18. This time constant is such as to distinguish between light pulses produced by either the high-to-low-beam or low-to-high-beam switching operations of the approaching vehicle and other types of incident light such as substantially steady light, less rapid changes in light of comparable intensity, or rapid changes in light of lower intensity.

The plate 30 of electronic tube 26 is connected through plate load resistor 32 to line 14 and cathode 34 is connected through cathode load resistor 36 to ground. Tube 26 thus functions as a phase splitter whereby a pulse applied to its grid produces a pulse of opposite sign at its plate and a pulse of similar sign at its cathode.

The plate 30 of electronic tube 26 is connected by line 38 through diode 40 and coupling condenser 42 to the grid 44 of thyratron 46. The cathode 34 of tube 26 is connected by line 48 through diode 50 and coupling condenser 52 to the aforesaid grid 44. Grid 44 is connected to ground via resistor 58. Resistor 54, connected between line 38 and ground, and resistor 56, connected between line 48 and ground, provide discharge paths for condensers 42 and 52, respectively. Diode 40, with its associated network of resistor 54, condenser 42 and resistor 58 taken with diode 50, with its associated network of resistor 56, condenser 52 and resistor 58 provide that either a positive or a negative pulse on the grid 24 of tube 26 is transmitted as a positive pulse on the grid 44 of thyratron 46. Diodes 40 and 50, each offering a low resistance path to positive pulses and a high resistance path to negative pulses, discriminate between positive and negative pulses emanating from tube 26 so that the positive and negative pulses appearing simultaneously at the plate and cathode, or vice-versa, of tube 26 do not cancel each other out at grid 44.

A sensitive relay 60, actuated by the light-sensitive system of the device, in part described above, in turn, actuates a power relay 98 which provides switching of current from battery 16 between the headlamp filaments to obtain high- or low-beam operation. By means of fixed contact 66 and spring-biased pivotal contact 68, the plate 64 of thyratron 46 is adapted either to be connected with or disconnected from the power supply through line 14, depending upon the deenergization or energization, respectively, of relay 60. Movable contact arm 68 is actuated by movement of the contact 70 of relay armature 72 when the relay is energized, the degree of proper movement of contact arm 68 being indicated by limit stop 75.

The cathode 74 of thyratron 46 is connected through cathode resistor 76 and positive biasing battery 78 to ground and, since the grid 44 is normally at ground potential and thus negative with respect to cathode 74, the thyratron is normally non-conducting. The plate 80 of electronic tube 82 is also connected to the cathode of thyratron 46, the connection being through the coil 84 of relay 60. The cathode 86 of tube 82 is biased positive with respect to ground by biasing battery 88 to such a degree that when the grid 90 is at ground potential the grid-cathode voltage of tube 82 is at or near the cutoff value. The grid 90 is connected directly to the cathode 15 of photocell 12 and the voltage applied to the grid will thus depend on the intensity of the light incident on the photocell. Wherein cathode biasing means have been shown in the form of batteries 78 and 88, it will be understood that biasing voltages could, alternatively, be supplied to the respective cathodes by any other appropriate means as, for example, by voltage-dividing networks comprising suitable impedance.

In the light-sensitive system thus far described, it will be noted that relay 60 is energized and electronic tube 82, having suitable grid voltage applied thereto, is conducting by reason of passage of current through relay coil 84 and the application of voltage to the plate 80 of tube 82. This occurs either through the supply of current from the cathode 74 of thyratron 46 if the latter is conducting or directly from line 14 through the closing of contacts 68 and 70 when relay 60 is energized, an overlap of the two supply means being provided to insure a proper supply, as will be described below. The capacitance of condenser 92, connected across relay coil 84 is chosen to provide a predetermined delay in the return of armature 72 to the deenergized position shown after tube 82 cuts off. Thus, undesired switching from low to high beam from a momentary loss of illumination on the photocell 12, such as might occur during certain driving conditions, can be avoided. Operation of relay 60, when thyratron 46 first fires, will not be undesirably delayed by the time required to charge condenser 92 provided that the balance of the circuit is of sufficiently low impedance.

The armature element 94 of relay 60, in making or breaking relationship with fixed contact 96, provides automatic energization and deenergization, respectively, of power relay 98 to effect switching of the headlamps 100 from high to low beam and vice-versa in response to the light-sensitive system. A manually operable override switch 102 permits switching of the headlamps independently of the automatic light-sensitive system, a foot-switch 104 being shown for operation in conjunction therewith when switch 102 is at the "manual" position.

With relay 60 energized, armature element 94 closes with fixed contact 96. With override switch 102 at the "automatic" position, line 106 is thereby closed, current passes through relay coil 108, the relay 98 is energized, relay armature 110 closes with contact 112, and the headlamp low-beam filaments are energized through connection with battery 16. With relay 60 non-energized, armature element 94 and fixed contact 96 are open, as shown, and, assuming override switch 102 at the "automatic" position, line 106 is broken, armature 110 is spring-biased to closed relationship with contact 113 and the headlamp high-beam filaments are energized through connection with battery 16. With override switch 102 at the "manual" position and foot-switch 104 open, relay 98 is non-energized and the high-beam filaments of the headlamps are energized. When foot-switch 104 is closed, relay 98 is energized and the headlamp low-beam filaments are energized. As will be apparent, foot-switch 104 could be dispensed with and the "manual" contacts of override switch 102 shorted if switch 102 alone were to be employed for diming purposes.

Let it initially be assumed, for example, that override switch 102 is at automatic position but that no functional light is incident on photocell 12. Plate voltage is supplied to thyratron 46 through closed contacts 66 and 68 but tube 82 is not conducting, no effective voltage being supplied to its grid 90, and relay 60 is not energized. Armature contacts 94 and 96 are thus at the open position shown, power relay 98 is not energized, and the headlamps are at high beam. This condition would exist, for example, during rural driving where one's own headlights provide substantially the only illumination present. The minimum level of light incident on the photocell 12 capable of producing a positive voltage on the grid of electron tube 82 sufficient for the latter to conduct is that provided by the low beam of an approaching vehicle from the moment it comes within a predetermined established range until it has passed. The minimum functional level of incident light on photocell 12 is principally determined by the voltage drop across resistor 18, which by Ohm's law is the product of the resistance of 18 and the photocell current, taken with the amount of positive bias applied by biasing means 88 to the cathode 86 of tube 82.

When a pulse of light of sufficient amplitude is incident on photocell 12, such as may be produced by switching the headlamps of an approaching vehicle, within proper range, from high to low beam or vice-versa, tubes 26, 46 and 82 will be caused to conduct, in sequence, as previously described. Sensitive relay 60 is energized and its armature 72 is drawn to the position whereat contacts 66 and 68 are broken, removing plate voltage from thyratron 46 and causing it to deionize and cease conducting. Contacts 70 and 68 close transferring the supply of plate voltage to tube 82 directly from line 14. Armature contacts 94 and 96 close causing the headlamps to be switched to low beam in the manner previously described. Tube 82 continues to conduct, relay 60 continues to be energized, and the armature contacts are maintained at their low-beam position as long as the light incident on photocell 12 is sufficient to produce the aforesaid voltage on the grid 90 of tube 82 required to maintain its continued conductance. When the approaching vehicle or vehicles providing the required amount of incident light have passed, the functional voltage on the grid of tube 82 ceases, relay 60 is deenergized, and the headlamps return to high beam. It is to be noted that armature contacts 70 and 68 will close before contacts 66 and 68 open, this make-before-break arrangement preventing interruption of the current through coil 84 and maintaining energization of relay 60 during movement of its armature.

The critical rate and amount of change of the incident light required to trigger thyratron 46 are in accordance with the preestablished sensitivity of photocell 12 and the selected values of circuit components. The voltage on the grid of tube 26, at any instant, is equal to the voltage at the arm of potentiometer 18, minus whatever voltage appears across condenser 22. Under static conditions, the grid side of condenser 22 is at ground potential and its opposite side is at the potential of the potentiometer arm. If the latter potential changes, the potential across condenser 22 tends to change by the same amount but at a rate which is determined by the combined values of the resistance of resistor 28 and the capacitance of condenser 22. As is well known in the art, the resistance-capacitance product, in this instance that of resistor 28 and condenser 22, is known as the time constant of the circuit and if this is large compared with the time interval of the change of applied voltage, such, for example, as that which would be produced either by the switching from low to high, or from high to low beam of the headlights of an approaching vehicle, the rate of change of the voltage across condenser 22 is much slower than the rate of change of the applied voltage, in this instance that existing at tap 20 of the potentiometer. The result is that, in the circuit illustrated, a decaying pulse is applied to the grid of tube 26, the initial value of which may be a large part of the total change present at tap 20 of the potentiometer. This value is of sufficient amplitude to cause tube 26 to conduct. It will be evident from the foregoing that if the time constant provided by resistor 28 and condenser 22 were small compared to the time interval of the change in applied voltage, such as would be produced by the slowly increasing illumination from either the steady high or low beam of an approaching vehicle, the transmitted pulse would have a peak value which was merely a small fraction of the total voltage change and in such as instance it would provide a pulse of insufficient amplitude to cause tube 26 to conduct.

Light-polarizing filter means 114 are shown, diagrammatically, mounted in association with the headlamps and, as previously mentioned, the device is particularly suited for use therewith. In a modification of the arrangement shown, a single polarized high-beam headlamp could be employed, the other headlamp designated 'high" in the drawing being utilized to house the automatic dimming device, including, for example, the photocell, instead of the conventional bulb. A further modification contemplates the additional use of polarizing filters in the path of the low beams. Inclusion of light-polarizing means assumes the use, also, by the driver of the vehicle thus equipped, of a light-polarizing viewing filter, for example, in the form of a visor mounted adjacent the windshield. Such a filter is effective to prevent glare from oncoming polarized headlights. In the circuit shown herein it will be understood that modifications in the character and disposition of components are possible, including the substitution of transistors for thermionic tubes, in conformance with accepted electronic practice.

It will further be understood that capacitor 92, by delaying the deenergization of relay 60 after tube 82 ceases to conduct, operates to prevent the automatic return to high beam during momentary loss of incident functional light on the photocell, such, for example, as might occur due to one approaching vehicle temporarily obstructing the headlamp beams of a following vehicle in a line of traffic.

It has previously been stated that when two vehicles equipped with light-polarizing headlamp and viewing filter means were approaching one another no deflection of the high beams would be necessary because the light-polarizing viewing filter of each vehicle would substantially eliminate glare from the polarized beams of the other. However, there may be instances as, for example, in a rural environment, where the driver of a light-polarizing equipped vehicle has his light-polarizing viewing visor removed from his field of view. In such as event he might be unable to determine whether an approaching vehicle were similarly equipped with light-polarizing headlamp and viewing filter means or not. If he assumes that the approaching vehicle is not thus equipped, he may, in all probability, "blink" his headlamps to request the driver of the approaching vehicle to lower the offending high polarized beams rather than position his viewing visor in the field of view to reduce their brilliance. To prevent the unnecessary and undesirable deflection to low beam status of the light-polarizing headlamps of the approaching vehicle in a situation of this kind, a light-polarizing filter 116 is placed across the light-admitting aperture of the photoelectric cell means.

In a given equipped vehicle, a mutually similar polarizing direction or characteristic is to be assumed as existing in the headlamp, viewing visor and photoelectric cell light-polarizing filter means. Assuming, for example, plane polarizing means having a polarizing direction arranged at approximately 45° to the horizontal to be employed in both vehicles, it will be apparent that the polarizing direction of the headlamp beams from one approaching vehicle will be at approximately 90° to the polarizing direction of the viewing visor and photoelectric cell filter of the other, by reason of their traveling in opposite directions, and that the polarized light beams will be effectively blocked out and reduced to a very low level of visible light. This level will be so low as to have no functional effect when incident on the photoelectric cell of the device of the present invention and, assuming the headlamps of a vehicle equipped with the device to be at polarized high beam position, they will remain at this position until a pulse of nonpolarized light is received, as hereinbefore described. The driver of the equipped approaching vehicle, finding no response to the "blinking" of his headlamps, will then assume the other vehicle to have polarizing headlamps and will promptly position his viewing visor in the path of the oncoming beams.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. An automatic light-sensitive headlamp-dimming device selectively responsive to a pulse of incident light in contradistinction to substantially steady incident light and light of slowly changing effective intensity, said device comprising photoelectric cell means, means electrically connected with said photoelectric cell means providing a time constant and constituting a differentiating circuit selectively responsive to a voltage pulse introduced from said photoelectric cell means and deriving from said pulse of incident light, said circuit providing a rate of change of voltage which is less rapid than that of said introduced voltage and a voltage pulse which approximates the peak value thereof, electronic phase splitting means electrically connected with said differentiating circuit and producing two voltage pulses of opposite sign in response to each voltage pulse received from said circuit, discriminating diode and associated network means electrically connected with said phase splitting means for providing a single positive voltage pulse in response to said two pulses of opposite sign, headlamp means having light-polarizing filters associated therewith, an electronic switching means electrically connected with said network circuit means and responsive to said single positive voltage pulse, said electronic switching means, in turn providing energization of said headlamp means.

2. An automatic light-sensitive headlamp-dimming device selectively responsive to a pulse of incident light in contradistinction to substantially steady incident light and light of slowly changing effective intensity, said device comprising photoelectric cell means, capacitor and resistor means, electrically connected with said photoelectric cell means, together providing a time constant and constituting a differentiating circuit selectively responsive to a voltage pulse introduced from said photoelectric cell means and deriving from said pulse of incident light, said circuit providing a rate of change of voltage across said capacitor means thereof which is less rapid than that of said introduced voltage and a voltage pulse approximating the peak value thereof, electronic phase splitting means connected with said differentiating circuit and producing two voltage pulses of opposite sign in response to each voltage pulse received from said circuit, discriminating diode and associated network circuit means connected with said phase splitting means for providing a single positive voltage pulse in response to said two pulses of opposite sign, headlamp means having light-polarizing filters associated therewith, and electronic switching means connected with said network circuit means and responsive to said single positive voltage pulse, said electronic switching means, in turn, providing energization of relay means actuating said headlamp means.

3. An automatic headlamp-dimming device initially responsive only to a pulse of light as produced by an approaching vehicle, said device comprising photoelectric cell means, capacitor and resistor means electrically connected with said photoelectric cell means, said capacitor and resistor means together constituting a differentiating circuit having a time constant which bears a predetermined given relation to a voltage pulse introduced from said photoelectric cell means and which derives from said pulse of light, said circuit providing a rate of change of voltage across said capacitor means thereof which is slower than that of said introduced voltage and a voltage pulse which approximates the peak value thereof, electronic phase splitting means electrically connected with said differentiating circuit and producing two voltage pulses of opposite sign in response to each voltage pulse received from said circuit, pulse discriminating diode and associated network circuit means electrically connected with said phase splitting means for providing a single positive voltage pulse in response to said two pulses of opposite sign, electronic switching means electrically connected both with said network circuit means and said photoelectric cell means and responsive to said single positive voltage pulse in conjunction with voltage from said photoelectric cell means, sensitive relay means electrically connected with and actuated by said electronic switching means, and means mechanically connected with said relay means for controlling the energization of high- and low-beam filaments, at least said high-beam headlight filaments, having light-polarizing means associated therewith which render said device adapted to use in a glare-reducing system for automotive vehicles employing polarized light.

4. An automatic headlamp-dimming device, as defined in claim 3, wherein said sensitive relay means actuates a power relay, the latter controlling a supply of current for energizing said headlamp filaments.

5. An automatic headlamp-dimming device, as defined in claim 4, wherein manually-operable override switching means is included in the circuit for energizing said power relay.

6. An automatic headlamp-dimming device as defined in claim 3, wherein capacitor means is connected across the coil of said sensitive relay means to delay deenergization of said relay means in response to a momentary loss of light, of given maximum duration, by said photoelectric cell means.

7. An automatic headlamp-dimming device initially responsive only to a pulse of light as produced by an approaching vehicle, said device comprising photoelectric cell means, a light-polarizing filter positioned adjacent to said photoelectric cell means in the path of light incident thereupon, capacitor and resistor means electrically connected with said photoelectric cell means, said capacitor and resistor means together constituting a differentiating circuit having a time constant which bears a predetermined given relation to a voltage pulse introduced from said photoelectric cell means and which derives from said pulse of light, said circuit providing a rate of change of voltage across said capacitor means thereof which is slower than that of said introduced voltage and a voltage pulse which approximates the peak value thereof, electronic phase splitting means electrically connected with said differentiating circuit and producing two voltage pulses of opposite sign in response to each voltage pulse received from said circuit, pulse discriminating diode and associated network circuit means electrically connected with said phase splitting means for providing a single positive voltage pulse in response to said two pulses of opposite sign, electronic switching means electrically connected both with said network circuit means and said photoelectric cell means and responsive to said single positive voltage pulse in conjunction with voltage from said photoelectric cell means, sensitive relay means electrically connected with and actuated by said electronic switching means, and means mechanically connected with said relay means for controlling the energization of high- and low-beam headlamp filaments, at least said high-beam headlight filaments having light-polarizing means associated therewith which render said device adapted to use in a glare-reducing system for automotive vehicles employing polarized light.

8. An automatic control device selectively and respectively responsive to a pulse of incident light, to continuously incident light of a minimum intensity, and to incident light of less than said minimum intensity for automatically operating low- and high-beam headlamp means of an automotive vehicle, said device comprising light-polarizing filter means associated with at least said high-beam headlamp means, photoelectric cell means, capacitor and resistor means electrically connected with said photoelectric cell means and together constituting a differentiating circuit having a time constant which bears a given relation to a voltage pulse introduced from said photoelectric cell means and which derives from said pulse of incident light, said circuit providing a rate of change of voltage across said capacitor means thereof which is slightly slower than that of said introduced voltage but which approximates the peak value thereof, triode electronic tube phase splitting means electrically connected with said differentiating circuit and producing two voltage pulses of opposite sign in response to each voltage pulse received from said circuit, discriminating diode and associated network circuit means comprising resistor and capacitor means electrically connected with said phase splitting means for providing a single positive voltage pulse in response to said two pulses of opposite sign, combined thyratron and triode electronic tube switching means electrically interconnected and also electrically connected both with said network and said photoelectric cell means, said electronic tube switching means comprising associated resistor and cathode biasing means and being responsive to said single positive voltage pulse in conjunction with voltage applied concurrently and directly to the grid of said triode electronic tube thereof from said photoelectric cell means, a sensitive relay electrically connected with and actuated by said electronic tube switching means, and a power relay actuated by said sensitive relay, said power relay comprising switching means for operating said low- and high-beam headlamp means.

9. An automatic control device, as defined in claim 8, wherein manually-operable override switching means is included in the power circuit for said low- and high-beam headlamp means.

10. An automatic control device selectively and respectively responsive to a pulse of incident light, to continuously incident light of a minimum intensity, and to incident light of less than said minimum intensity for automatically operating low- and high-beam headlamp means of an automotive vehicle, said device comprising light-polarizing filter means associated with at least said high-beam headlamp means, photoelectric cell means, a plurality of light-polarizing filters having substantially uniform polarizing directions mounted, respectively, adjacent to said photoelectric cell means in a path of light incident thereupon and in paths of light emanating from said headlamp means, capacitor and resistor means electrically connected with said photoelectric cell means and together constituting a differentiating circuit having a time constant which bears a given relation to a voltage pulse introduced from said photoelectric cell means and which derives from said pulse of incident light, said circuit providing a rate of change of voltage across said capacitor means thereof which is slightly slower than that of said introduced voltage but which approximates the peak value thereof, triode electronic tube phase splitting means electrically connected with said differentiating circuit and producing two voltage pulses of opposite sign in response to each voltage pulse received from said circuit, discriminating diode and associated network circuit means comprising resistor and capacitor means electrically connected with said phase splitting means for providing a single positive voltage pulse in response to said two pulses of opposite sign, combined thyratron and triode electronic tube switching means electrically interconnected and also electrically connected both with said network and said photoelectric cell means, said electronic tube switching means comprising associated resistor and cathode biasing means and being responsive to said single positive voltage pulse in conjunction with voltage applied concurrently and directly to the grid of said triode electronic tube thereof from said photoelectric cell means, a sensitive relay electrically connected with and actuated by said electronic tube switching means, and a power relay actuated by said sensitive relay, said power relay comprising switching means for operating said low- and high-beam headlamp means.

References Cited in the file of this patent

UNITED STATES PATENTS

| | | |
|---|---|---|
| 2,032,128 | Horsfield | Feb. 25, 1936 |
| 2,423,322 | Hurley | July 1, 1947 |
| 2,671,128 | Zworykin et al. | Mar. 2, 1954 |
| 2,830,192 | Atkins | Apr. 8, 1958 |
| 2,968,743 | Buzzell | Jan. 17, 1961 |
| 2,969,468 | Hogue | Jan. 24, 1961 |

FOREIGN PATENTS

| | | |
|---|---|---|
| 582,784 | Great Britain | Nov. 27, 1946 |